United States Patent
Okada et al.

(10) Patent No.: US 6,534,218 B1
(45) Date of Patent: *Mar. 18, 2003

(54) ELECTRODE FOR NONAQUEOUS ELECTROLYTE BATTERY

(75) Inventors: Mikio Okada, Kyoto (JP); Hideo Yasuda, Kyoto (JP)

(73) Assignee: Japan Storage Battery Co., Ltd., Kyoto (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/117,965

(22) Filed: Aug. 10, 1998

(30) Foreign Application Priority Data

Feb. 9, 1996 (JP) ............................... 8-047994

(51) Int. Cl.⁷ ............................... H01M 4/62

(52) U.S. Cl. ................. 429/232; 429/217; 429/212; 429/246

(58) Field of Search ............... 429/212, 232, 429/246, 217

(56) References Cited

U.S. PATENT DOCUMENTS

| | | | |
|---|---|---|---|
| 5,296,318 A | | 3/1994 | Gozdz et al. |
| 5,618,640 A | * | 4/1997 | Idota et al. .............. 429/194 |
| 5,658,692 A | * | 8/1997 | Ohasaki et al. .......... 429/231.8 |
| 5,677,084 A | * | 10/1997 | Tsukamoto et al. ....... 429/231.8 |
| 5,698,339 A | * | 12/1997 | Kawakami et al. |
| 5,789,114 A | * | 8/1998 | Adachi et al. |
| 5,795,679 A | * | 8/1998 | Kawakami et al. |
| 6,027,836 A | * | 2/2000 | Okada et al. ............. 429/314 |

FOREIGN PATENT DOCUMENTS

JP  A-7-29565  1/1995

OTHER PUBLICATIONS

J. Electrochimica Acta 40 (1995) 2119, Apr. 1995.
J. Electrochem. Soc. 137 (1990) 1657, May 1990.
J. Appl. Electrochem. 24 (1994) 298, no month.
Electrochimica Acta 28 (1983) 833, no month.
Electrochimica Acta 28 (1983) 591, no month.
J. Electrochem. Soc. 140 (1993) L96, Jun. 1993.
Electrochimica Acta 40 (1995) 2289, no month.
Solid State Ionics 70/71 (1994) 20, no month.
J. Electrochemica. Soc. 141 (1994) 779, Aug. 1994.
J. Polym. Sci. A32 (1994) 779, no month.
J. Electrochem. Soc. 142 (1995) 683, Mar. 1995.
J. Power Sources 52 (1994) 261, no month.
Electrochimica Acta 40 (1995) 2101, no month.
Electrochimica Acta 40 (1995) 2197, no month.

* cited by examiner

Primary Examiner—Carol Chaney
Assistant Examiner—Tracy Dove
(74) Attorney, Agent, or Firm—Sughrue Mion, PLLC (57) ABSTRACT

The following aspects (1) to (4) of the present invention can provide an electrode for a nonaqueous electrolyte battery having excellent safety and charged storage properties and good high rate charge-discharge properties. (1) An electrode for nonaqueous electrolyte battery comprising a particulate active material having a porous film formed thereon. (2) An electrode for nonaqueous electrolyte battery comprising an active material having a filler held in pores. (3) An electrode for nonaqueous electrolyte battery comprising an active material which undergoes volumetric expansion and shrinkage during charge-discharge, having a filler held in pores. (4) The electrode for a nonaqueous electrolyte battery according to embodiment (1), wherein said porous film is an ionically-conductive film.

16 Claims, 1 Drawing Sheet

FIG. 1

ELECTRODE FOR NONAQUEOUS ELECTROLYTE BATTERY

TECHNICAL FIELD

The present invention relate.s to an electrode for non-aqueous electrolyte battery.

BACKGROUND OF THE INVENTION

In recent years, with the development of electronic apparatus, the appearance of a novel high performance battery has been expected more and more. At present, as primary battery used as power supply for electronic apparatus there is mainly used manganese dioxide-zinc battery. As secondary battery used as power supply for electronic apparatus there is mainly used nickel battery such s nickel-cadmium battery, nickel-zinc battery and nickel-metal hydride battery or lead-acid battery.

As the electrolyte solution for these batteries there is used an aqueous solution of alkali such as potassium hydroxide or an aqueous solution of sulfuric acid or the like. The theoretical decomposition voltage of water is 1.23 V. A battery system having an electromotive force of higher than this value is liable to experience decomposition of water that makes it difficult to stably store an electric energy. Therefore, nothing but a battery system having an electromotive force of about 2 V at highest has been put into practical use. Accordingly, as the electrolyte solution for high voltage batteries having an electromotive force of not lower than 3 V there must be used a nonaqueous electrolyte solution. A typical example of such a battery is a so-called lithium battery comprising lithium as a negative electrode.

Examples of primary lithium battery include manganese dioxide-lithium battery, and carbon fluoride-lithium battery. Examples of secondary lithium battery include manganese dioxide-lithium battery, and vanadium oxide-lithium battery.

A secondary battery comprising metallic lithium as a negative electrode is disadvantageous in that it is liable to internal short due to dendritic growth of metallic lithium and thus has a reduced life. Further, since metallic lithium has a high reactivity, such a secondary battery can be hardly provided with a high safety. In order to eliminate these difficulties, a so-called lithium ion battery comprising graphite or carbon instead of metallic lithium and lithium cobaltate or lithium nickelate as e positive electrode has been devised and used as a high energy density battery. In recent years, with the expansion of usage, batteries having higher performance and safety have been desired.

Unlike lead-acid battery, nickel-cadmium battery and nickel-metal hydride battery, which comprise an aqueous solution as an electrolyte, lithium battery and lithium ion battery (hereinafter collectively referred to as "lithium-based battery") comprise a combustible organic electrolyte solution as an electrolyte. For the sake of safety, the lithium-based battery needs to be equipped with various safety elements such as safety valve, protective circuit and PTC element which add to cost. The conventional batteries comprising a nonaqueous electrolyte solution are liable to experience vaporization of the electrolyte solution due to heat generation during shortcircuiting or other troubles, which causes a sudden rise in the inner pressure thereof. In a lithium ion battery comprising a carbon-based negative electrode represented by $Li_xC_6$, as the percent utilization of negative electrode is raised and intercalation proceeds, the rise in the temperature and pressure in the battery due to internal short or other troubles causes lithium and carbon in the negative electrode to react with each other to produce lithium carbide with the generation of heat. As a result, the inner pressure of the battery shows a sudden further rise. Thus, this lithium ion battery leaves something to be desired in safety. Accordingly, at present, the percent utilization of the carbon-based negative electrode is limited to less than 60% ($Li_xC_6$, $0 \leq x < 0.6$) taking into account the safety, making it impossible to obtain a practical battery having a high energy density.

Further, since the lithium-based battery exhibits a higher battery voltage than the aqueous solution battery, the electrolyte solution undergoes decomposition by oxidation or reduction while it is kept being charged. Thus, the lithium-based battery has deteriorated charged storage properties.

In an attempt to improve the safety and charged storage properties of battery, the use of a solid electrolyte having a reduced chemical reactivity instead of electrolyte solution has been proposed (Electrochimica Acta 40 (1995) 2119). Further, in an attempt to render the battery shape flexible, simplify the production process and reduce the production cost, the application of a solid polymer electrolyte has been proposed.

Concerning ionically-conductive polymers, many complexes of polyether such as polyethylene oxide and polypropylene oxide with alkali metal salt have been studied. However, polyether cannot provide a high ion conductivity while maintaining a sufficient mechanical strength. Further, the ion conductivity of the polyether is drastically affected by temperature and thus cannot provide a sufficient ion conductivity at room temperature. Thus, the use of comb-shaped polymer having polyether in its side chains, copolymer of polyether chain with other monomers, polycyloxane having polyether in its side chains or crosslinked polyphosphazene or polyether has been attempted.

In an ionically-conductive polymer having a salt dissolved therein such as polyether-based polymer electrolyte, both cation and anion migrate. Such an ionically-conductive polymer normally exhibits a cation transport number of not more than 0.5 at room temperature. Thus, in an attempt to provide a lithium ion transport number of 1, ionically-conductive polymer containing an anionic group such as —$SO^{3-}$ and —COO— has been synthesized. However, lithium ion is strongly constrained by anionic group in such a compound. Thus, such a compound cannot be hardly used in lithium-based batteries.

Further, the application of a gel solid electrolyte prepared by impregnating a polymer with an electrolyte solution to lithium-based batteries has been attempted. Examples of polymer used in the gel solid electrolyte include polyacrylonitrile (J. Electrochem. Soc. 137 (1990) 1657, J. Appl. Electrochem. 24 (1994) 298), polyvinylidene fluoride (Electrochimica Acta 28 (1983) 833, 28 (1983) 591), polyvinyl chloride (J. Electrochem. Soc. 140 (1993) 196), polyvinylsulfone (Electrochimica Acta 40 (1995) 2289, Solid State Ionics 70/71 (1994) 20), and polyvinylpyrrolidinone. In an attempt to reduce the degree of crystallization of polymer, facilitating the impregnation thereof with an electrolyte solution and hence improving the ion conductivity, the use of a copolymer of vinylidene fluoride with hexafluoropropylene has been proposed (U.S. Pat. No. 5,296,318). The preparation of a lithium ionically-conductive polymer film which comprises drying a latex such as nitrile rubber, styrene butadiene rubber, polybutadiene and polyvinyl pyrrolidone to prepare a polymer film, and then impregnating the polymer film with an electrolyte solution has been proposed (J. Electrochem. Soc. 141 (1994) 1989, J. Polym.

Sci. A 32 (1994) 779). Referring to the preparation of a polymer electrolyte from a latex, the mixing of two kinds of polymers has been proposed to provide a mixture of a polymer phase which can hardly be impregnated with an electrolyte solution and thus maintains a high mechanical strength and a polymer phase which can easily be impregnated with an electrolyte solution and thus exhibits a high ion conductivity and hence provide a polymer film which gives a high mechanical strength and a high ion conductivity.

Further, a solid electrolyte obtained by filling the pores in a microporous polyolefin film with a polymer electrolyte for the purpose of increasing the mechanical strength and improving the handleability of polymer electrolyte film (J. Elecrochem. Soc. 142 (1995) 683) and a polymer electrolyte comprising an inorganic solid electrolyte powder incorporated therein for the purpose of improving the ion conductivity and increasing the cation transport number (J. Power Sources 52 (1994) 261, Electrochimica Acta 40 (1995) 2101, 40 (1995) 2197) have been reported.

As mentioned above, various polymer electrolytes have been proposed. However, no polymer electrolytes giving essential solution to the problem of diffusion of lithium ion have been reported. Thus, the properties of nonaqueous batteries have not been sufficient as compared with that of aqueous batteries. In a lithium-based battery, the majority of lithium ions taking part in the electrode reaction during charge-discharge reaction is not dissolved in the electrolyte originally, but released from the active material in an opposing electrode. Thus, the moving distance of lithium ion is long. Further, the transport number of lithium ion in the electrolyte of a lithium-based battery at room temperature is normally not more than 0.5 while the transport number of proton and hydroxide ion in the aqueous battery is close to 1. In a lithium-based battery, the moving rate of ion in the electrolyte is governed by the diffusion of ion. Moreover, since an organic electrolyte has a higher viscosity than an aqueous solution, it allows ion diffusion at a lower rate than an aqueous solution. Accordingly, a lithium-based battery comprising an organic electrolyte solution is disadvantageous in that it is inferior to an aqueous battery in high rate charge-discharge properties. This problem becomes very remarkable at low temperatures. A lithium-based battery comprising a polymer electrolyte solution allows ion diffusion at a even lower rate than one comprising an organic electrolyte instead of electrolyte solution and thus is disadvantageous in that it is more inferior to a nonaqueous battery comprising an organic electrolyte solution in high rate charge-discharge properties.

As the solid electrolyte to be used in a lithium-based battery there has been applied a lithium ionically-conductive inorganic solid electrolyte besides polymer electrolyte. However, such a lithium ionically-conductive inorganic solid electrolyte has some disadvantages. In other words, it cannot provide a sufficient lithium ion conductivity. Further, it lacks resistance to reduction-oxidation. Moreover, the volumetric expansion and shrinkage of the active material during charge-discharge causes the active material to be peeled off the inorganic solid electrolyte. Thus, such a lithium ionically-conductive inorganic solid electrolyte has never been put into practical use.

Since an organic electrolyte is combustible, a lithium-based battery comprising an organic electrolyte needs to be equipped with various safety elements such as safety valve, protective circuit and PTC element for the sake of safety, adding to cost. Further, since a lithium-based battery exhibits a higher battery voltage than an aqueous solution battery, the electrolyte solution undergoes decomposition by oxidation or reduction while it is kept being charged. Thus, a lithium-based battery has deteriorated charged storage properties. A lithium-based battery comprising a polymer electrolyte instead of an electrolyte solution for the purpose of improving the safety and charged storage properties thereof is disadvantageous in that it allows ion diffusion in the electrolyte at a reduced rate and thus cannot perform charging and discharging at a high rate. Such a lithium-based battery exhibits remarkably deteriorated high rate charge-discharge properties at low temperatures. The present invention has been worked out in the light of these problems. The present invention provides an electrode for nonaqueous electrolyte battery which exhibits excellent safety and charged storage properties and good high rate charge-discharge properties.

DISCLOSURE OF THE INVENTION

One aspect of the present invention concerns an electrode for nonaqueous electrolyte battery based on quite a novel principle comprising a particulate active material having a porous film formed thereon. Thus, a nonaqueous electrolyte battery excellent in safety, charged storage properties and high rate charge-discharge properties can be provided.

Another aspect of the present invention concerns an electrode for nonaqueous electrolyte battery based on quite a novel principle comprising an active material having a filler held in pores. Thus, a nonaqueous electrolyte battery excellent in safety, charged storage properties and high rate charge-discharge properties can be provided.

A further aspect of the present invention concerns an electrode for nonaqueous electrolyte battery based on quite a novel principle comprising an active material which undergoes volumetric expansion and shrinkage during charging and discharging, having a filler held in pores. Thus, a nonaqueous electrolyte battery excellent in safety, charged storage properties and high rate charge-discharge properties can be provided.

A still further aspect of the present invention concerns an electrode for nonaqueous electrolyte battery based on quite a novel principle comprising a particulate active material having a porous ionically-conductive film formed thereon. Thus, a nonaqueous electrolyte battery excellent in safety, charged storage properties and high rate charge-discharge properties can be provided.

BEST MODE FOR CARRYING OUT THE PRESENT INVENTION

In the conventional liquid electrolyte lithium-based battery, the particulate active material is covered by an organic electrolyte solution and comprises the organic electrolyte solution in the pores. Thus, the particulate active material comes in contact with a large amount of the organic electrolyte solution. Since the organic electrolyte solution is combustible and has a higher chemical reactivity than an aqueous solution, the chemical reaction of the active material with the electrolyte solution can easily proceed when the inner temperature of the battery rises due to the shortcircuiting of the battery, external heating, etc. If this reaction is an exothermic reaction, it proceeds explosively, possibly causing the battery to be ignited and detonated. Further, since a lithium-based battery exhibits a higher battery voltage than an aqueous solution-based battery, it undergoes decomposition of the electrolyte solution due to oxidation or reduction while being stored charged when the particulate active material comes in contact with a large amount of an organic electrolyte solution. Thus, a lithium-based battery exhibits deteriorated charged storage properties.

In order to solve these problems, the use of a solid electrolyte instead of an organic electrolyte solution has been attempted. However, an organic solid electrolyte allows ion diffusion at a very low rate and thus provides deteriorated high rate charge-discharge properties. The use of an inorganic solid electrolyte has some disadvantages. In other words, it cannot provide a sufficient lithium ion conductivity. Further, it lacks resistance to reduction-oxidation. Moreover, the volumetric expansion and shrinkage of the active material during charge-discharge causes the active material to be peeled off the inorganic solid electrolyte.

The foregoing problems can be solved by one aspect of the present invention which provides an electrode for nonaqueous electrolyte battery comprising a particulate active material a porous film formed thereon.

The foregoing problems can be solved by another aspect of the present invention which provides an electrode for nonaqueous electrolyte battery comprising an active material having a filler held in pores.

The foregoing problems can be solved by a further aspect of the present invention which provides an electrode for nonaqueous electrolyte battery comprising an active material which undergoes volumetric expansion and shrinkage during charge-discharge, having a filler held in pores.

The foregoing problems can be solved by a still further aspect of the present invention which provides an electrode for nonaqueous electrolyte battery comprising a particulate active material a porous ionically-conductive film formed thereon.

In the nonaqueous electrolyte battery comprising an electrode comprising a particulate active material having a porous film formed thereon according to the present invention, the amount of an organic electrolyte solution in contact with the active material can be drastically reduced, making it possible to inhibit the reaction of the active material with the organic electrolyte solution and hence remarkably improve the safety and charged storage properties of the battery. Further, the particulate active material is covered by a film. Therefore, unlike the conventional solid electrolyte battery, the nonaqueous electrolyte battery comprises a solid electrolyte having an extremely small thickness and an organic electrolyte solution present even in the vicinity of the particulate active material. Ion can easily migrate in an organic electrolyte solution. Thus, ion can diffuse through an organic electrolyte solution at a high rate. Further, since the film covering the active material is porous, the electrolyte solution can be contained in the pores in the film so that ion can readily diffuse in the pores, providing a battery excellent in high rate charge-discharge properties. Even if the film is porous, the amount of the organic electrolyte solution in contact with the active material can be drastically reduced. As a result, a battery excellent all in safety, charged storage properties and high rate charge-discharge properties can be provided. Further, by making the porous film lithium ionically-conductive, a battery more excellent in high rate charge-discharge properties can be provided.

Also in a nonaqueous electrolyte battery comprising an electrode comprising an active material having a filler held in pores, the contact area of the particulate active material with the electrolyte solution can be drastically reduced as in the electrode comprising a particulate active material having a porous film formed thereon. Further, since the amount of the organic electrolyte solution in the vicinity of the particulate active material can be reduced, the self discharge reaction of the active material with the electrolyte solution and the explosive exothermic reaction of the active material with the electrolyte solution during the rise in the inner temperature of the battery can be inhibited, making it possible to remarkably improve the safety and charged storage properties of the battery. Further, since lithium ion can migrate in the solid phase of the particulate active material, and the transport number of lithium ion in this case is 1, lithium ion can rapidly migrate throughout the particulate active material even if no electrolyte solution is present in the pores of the particulate active material. Accordingly, the resulting battery is excellent all in safety, charged storage properties and high rate charge-discharge properties. In a nonaqueous electrolyte battery comprising an electrode comprising an active material having a filler held in pores, the particulate active material comes in contact with the electrolyte solution on the surface thereof other than the inner surface of the pores. Thus, the battery exhibits very excellent high rate charge-discharge properties. An electrode comprising a particulate active material having a filler held in pores, said particulate active material being covered by a lithium ionically-conductive film or porous film, can provide a battery having very excellent safety and charged storage properties. The conventional solid electrolyte battery is liable to the peeling of the active material off the electrolyte at the interface thereof due to the volumetric expansion and shrinkage of the active material during charge-discharge. In a nonaqueous electrolyte battery comprising an electrode comprising an active material having a filler held in pores according to the present invention, the material which has filled the pores in the particulate active material cannot easily come out of the pores even if the active material undergoes volumetric expansion and shrinkage during charge-discharge. Thus, in the present invention, even if the active material undergoes volumetric expansion and shrinkage during charge-discharge, the safety and charged storage properties of the battery can be improved.

A lithium ion battery comprising a carbon-based negative electrode represented by $Li_xC_6$, as the percent utilization of negative electrode is raised and intercalation proceeds, the rise in the temperature and pressure in the battery due to internal short or other troubles causes lithium and carbon in the negative electrode to react with each other to produce lithium carbide ($Li_2C_2$) with the generation of heat. As a result, the inner pressure of the battery shows a sudden further rise. Thus, this lithium ion battery leaves something to be desired in safety. Accordingly, at present, the percent utilization of the carbon-based negative electrode is limited to less than 60% ($Li_xC_6$, $0 \leq x < 0.6$) taking into account the safety, making it impossible to obtain a practical battery having a high energy density. The application of the present invention to a lithium-based battery comprising a carbon-based negative electrode, if the amount of the organic electrolyte solution present in the vicinity of the particulate active material is reduced, makes it difficult to raise the inner pressure in the vicinity of the active material because there is less electrolyte solution in the vicinity of the active material. Thus, the lithium carbide production reaction can be inhibited, making it possible to drastically decrease the safety of the battery. Accordingly, the present invention is very effective for a lithium ion battery comprising a carbon-based negative electrode.

As the carbon-based negative electrode to be used in a lithium ion battery there may be mainly used graphite having a high degree of crystallization and carbon having a low degree of crystallization. The particulate negative active material made of carbon has more pores than the particulate negative active material made of graphite. Accordingly, the conventional battery comprising an organic electrolyte solution contains a large amount of an organic electrolyte solution in the particulate negative active material and thus leaves something to be desired in safety. The application of the present invention to a lithium ion battery comprising a carbon-based negative electrode, if an active material having a filler held in pores is used, makes it possible to drastically reduce the amount of the electrolyte solution in the particulate active material and hence drastically improve the safety and charged storage properties of the battery. Accordingly, the present invention is extremely effective for a lithium ion battery comprising a carbon-based negative electrode.

The present invention will be further described in the following preferred examples.

The preparation of the positive electrode will be described hereinafter. In some detail, a mixture of 70 wt-% of lithium cobaltate, 6 wt-% of acetylene black, 9 wt-% of polyvinylidene fluoride and 15 wt-% of n-methyl-2-pyrrolidone (NMP) was applied to a stainless steel sheet having a width of 20 mm, a length of 480 mm and a thickness of 20 $\mu$m, and then dried at a temperature of 150° C. to cause NMP to vaporize. This procedure was effected on both sides of the stainless steel sheet. The stainless steel sheet thus coated was then pressed to form a positive electrode. The positive electrode thus formed had a thickness of 170 $\mu$m. The weight of the active material, electrically conducting agent and binder packed per unit area was 23 $\mu$g/cm$^2$.

The negative electrode was prepared as follows. Low crystallinity amorphous mesocarbon microbeads (MCMB) having a particle diameter of 25 $\mu$m prepared by calcining at a temperature of 1,000 ° C. were immersed in a solution of 1% by weight of a vinylidene fluoride-hexafluoropropylene copolymer (P(VDF/HFP))(88:12) having a molecular weight of about 380,000 in NMP. The mixture was then filtered with suction to remove extra NMP solution of P(VDF/HFP). Thus, MCMB grains were coated with NMP solution of P(VDF/HFP) to a small thickness. The MCMB grains were then dried at a temperature of 150° C. for 1 hour to remove NMP and solidify P(VDF/HFP) coat on MCMB grains. Thus, MCMB grains coated with P(VDF/HFP) to a small thickness were prepared. The P(VDF/HFP) film was then-subjected to porous treatment as follows. In some detail, the particulate negative active material which had been coated with P(VDF/HFP) and dried was immersed in a 60° C. dimethyl carbonate (DMC) having lithium chloride dissolved therein to saturation so that the P(VDF/HFP) film was impregnated with DMC solution of lithium chloride. The mixture was then filtered to remove DMC solution. The particulate negative active material was then rapidly cooled to 10° C. As a result, lithium chloride in the film became crystalline grain. The particulate negative active material was immersed in DMC so that the crystalline lithium chloride was dissolved in DMC. The mixture was filtered and heat-dried to remove DMC and lithium chloride from the particulate negative active material. By thus removing the crystalline lithium chloride from the P(VDF/HFP) film, the P(VDF/HFP) film became microporous. Thus, a particulate negative active material covered by a microporous P(VDF/HFP) film was prepared. Water was added to the MCMB grains covered by this microporous film to form a slurry. A foamed nickel having a porosity of 90%, a thickness of 400 $\mu$m, a width of 22 mm and a length of 480 mm was then filled with the slurry, dried at a temperature of 100° C. in vacuo for 1 hour, and then pressed to obtain a negative electrode having a thickness of 200 $\mu$m.

The positive electrode and negative electrode thus prepared were then wound with a polyethylene separator having a porosity of 40% provided interposed therebetween. The wound combination of positive electrode and negative electrode was then inserted into a stainless steel case equipped with a safety valve having a height of 47.0 mm, a width of 22.2 mm and a thickness of 6.4 mm. These elements were then assembled into a rectangular battery. Into the battery case was then vacuum-injected 2.5 g of an electrolyte solution obtained by mixing ethylene carbonate (EC) and diethyl carbonate (DEC) at a volumetric ratio of 1:1, and then adding LiPF$_6$ to the mixture in an amount of 1 mol/l. The P(VDF/HFP) coat on the particulate negative active material swelled in the electrolyte solution to provide a lithium ionically-conductive polymer electrolyte. In this manner, a battery (A) of the present invention having a nominal capacity of 400 mAh was prepared. Further, by using P(VDF/HFP) having different molecular weights and mixtures of vinylidene fluoride and hexafluoropropylene having different mixing proportions, the wettability of P(VDF/HFP) by the electrolyte solution can be controlled.

A battery (B) of the present invention having a nominal capacity of 400 mAh was prepared in the same manner as in the battery (A) of the present invention except that the pores in the particulate active material were filled with a polyvinyl chloride (PVC) instead of coating the particulate negative active material with a film. The filling of the pores in the particulate active material with PVC was accomplished as follows. In some detail, MCMB grains were immersed in a solution of 12% by weight of PVC having a molecular weight of 1,100 in NMP. The mixture was then pressed at 700 kgf/cm$^2$ to fill the pores in the MCMB grains with the NMP solution of PVC. The mixture was filtered with suction to remove extra NMP solution of PVC, and then dried at a temperature of 150° C. to remove NMP and solidify PVC. The MCMB grains were then immersed in NMP for only 30 minutes so that the PVC film covering the area of the grains other than the pores was dissolved in NMP while PVC in the pores was not dissolved in NMP. The mixture was then filtered with suction to remove NMP. The foregoing continuous procedure involving the filling of the pores in the MCMB grains with NMP solution of PVC, drying of the grains, and removal of PVC film from the area of the grains other than the pores was repeated five times so that the pores in the MCMB grains were filled with PVC.

A conventional known battery (C) of Comparative Example 1 having a nominal capacity of 400 mAh was prepared in the same manner as in the battery (A) of the present invention except that the MCMB grains were not coated with P(VDF/HFP).

A conventional known battery (D) of Comparative Example 2 having a nominal capacity of 400 mAh was prepared in the same manner as in the battery (A) of the present invention except that the gap between the negative active material grains was filled with a solid polymer electrolyte and only a slight amount of a free electrolyte solution was present in the negative active material layer. The filling of the gap between the negative active material grains with a solid polymer electrolyte was carried out as follows. In some detail, a solution of 12% by weight of P(VDF/HFP) (88:12) in NMP and MCMB were mixed at a weight ratio of 8:2. A foamed nickel having a porosity of 90%, a thickness of 400 µm, a width of 22 mm and a length of 480 mm was then filled with the mixture, dried at a temperature of 150° C. for 1 hour, and then pressed to prepare a negative electrode having a thickness of 200 µm. This pressing made it possible to eliminate most of the voids in the negative electrode. These elements were then assembled into a battery in the same manner as in the battery (A) of the present invention. When an electrolyte solution was then injected into the battery, P(VDF/HFP) in the negative electrode was impregnated with the electrolyte solution to obtain a lithium ionically-conductive polymer electrolyte.

The batteries (A) and (B) according to the present invention and the conventional known battery (C) of Comparative Example 1 were then subjected to the following comparison test for safety. These batteries were charged at a current of 1 CA to 4.5 V at room temperature. Subsequently, these batteries were charged at a constant voltage of 4.5 V for 2 hours. Thereafter, a pin having a diameter of 3 mm was passed through these batteries. Table 1 shows the results.

TABLE 1

|  | Safety valve | Fire |
| --- | --- | --- |
| Battery (A) | Worked | None |
| Battery (B) | Worked | None |
| Battery (C) | Worked | Observed |

As can be seen in Table 1, the conventional known battery (C) allowed the safety valve to work and showed emission while the batteries (A) and (B) according to the present invention allowed the safety valve to work but showed no fire. These results show that the batteries (A) and (B) according to the present invention exhibit better safety than the conventional known battery (C) of Comparative Example 1.

A comparison test for discharge capacity at low temperature was effected on the batteries (A) and (B) according to the present invention and the conventional known battery (D) of Comparative Example 2. At a temperature of −10° C., these batteries were charged at 1 CA to 4.1 V, charged at a constant voltage of 4.1 V for 2 hours, and then discharged at 1 CA to 3.0 V.

Figure 1:
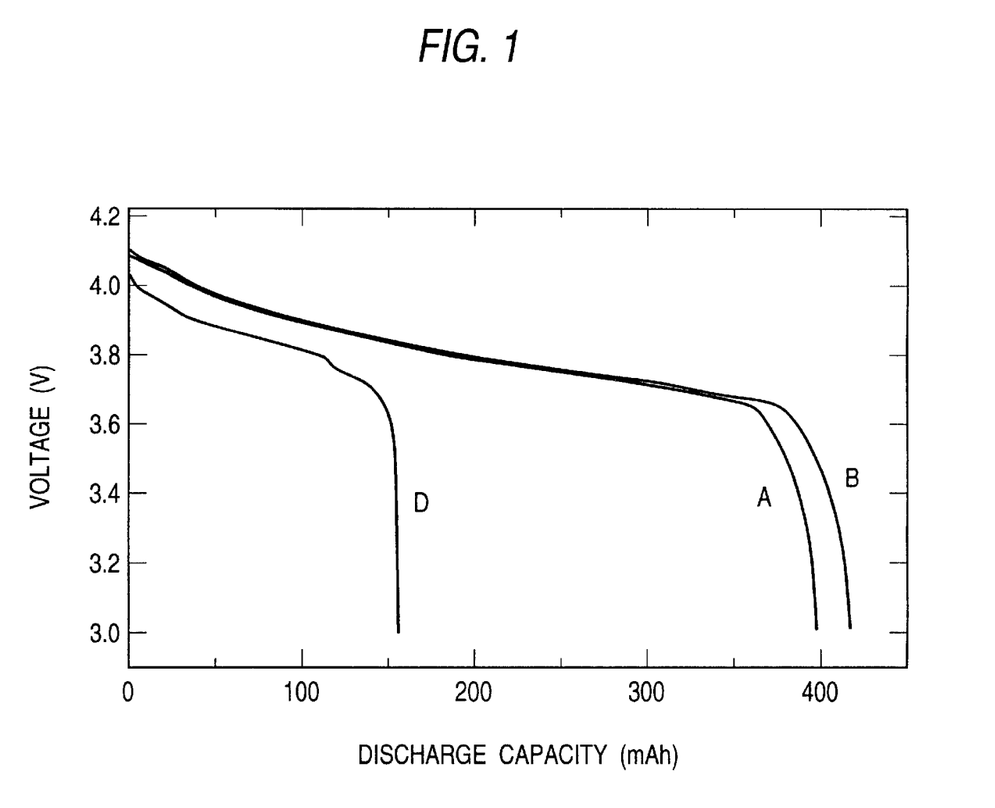
FIG. 1 is a graph illustrating the discharge properties of batteries (A) and (B) according to the present invention obtained in the following examples and a conventional known battery (D) of Comparative Example 2.

FIG. 1 is a graph illustrating the comparison of these batteries thus tested in discharge properties. As can be seen in FIG. 1, the batteries (A) and (B) according to the present invention exhibit excellent low temperature discharge properties as compared with the conventional known battery (D). Though not shown, the conventional known battery (C) of Comparative Example 1 was subjected to the same charge-discharge test as mentioned above. As a result, the battery (C) exhibited almost the same discharge properties as the battery (B) of the present invention. These results show that the batteries (A) and (B) according to the present invention exhibit almost the same low-temperature high-rate discharge properties as the conventional battery (C), demonstrating that the covering of the particulate active material by a porous film or the filling of the pores in the particulate active material with a material other than electrolyte solution allows the batteries to have little or no effect on the discharge properties thereof even at low temperature.

A battery (E) of the present invention having a nominal capacity of about 400 mAh was prepared in the same manner as the battery (A) of the present invention except that the particulate negative active material was covered by a polyacrylonitrile (PAN) film which had been subjected to porous treatment by a casting-extraction method instead of being covered by the PVC film which had been subjected to porous treatment by the removal of crystalline salt grains from the film. The term "casting-extraction method" as used herein is meant to indicate a process which comprises substituting a solvent (a) dissolving an polymer therein by a solvent (b) soluble in the solvent (a) and in which the polymer is insoluble so that a porous polymer is produced. The preparation of the particulate negative active material covered by a porous PAN film was carried out by the following manner. In some detail, MCMB grains were immersed in a solution of 1% by weight of PAN powder having a molecular weight of about 100,000 in NMP. The mixture was then filtered with suction to remove extra NMP solution of PAN so that MCMB grains were coated with the NMP solution of PAN to a small thickness. The MCMB grains thus treated were then immersed in water so that NMP in the NMP solution of PAN was replaced by water to prepare MCMB grains coated with a continuously porous PAN film. The MCMB grains thus treated were then dried at a temperature of 100° C. for 1 hour to remove water content therefrom. A foamed nickel was then coated on the MCMB grains in the same manner as the battery (A) of the present invention. The electrode was then assembled into a battery in the same manner as the battery (A) of the present invention. Into the battery was then injected an electrolyte solution so that the PAN film having pores coated on a particulate active material was impregnated with the electrolyte solution to form a lithium ionically-conductive polymer electrolyte.

The battery (E) of the present invention thus prepared was then subjected to the same test for discharge properties and safety as effected on the batteries (A) and (B) of the present invention. As a result, the battery (E) of the present invention exhibited excellent discharge properties and safety similar to that of the battery (A) of the present invention.

In the foregoing examples, as the material to be used as the film covering the particulate active material or the material which fills the pores in the particulate active material there was used P(VDF/HFP), PAN or PVC. However, the present invention is not limited to these compounds. For example, polyether such as polyethylene oxide and polypropylene oxide, polyacrylonitrile, polyvinylidene fluoride, polyvinylidene chloride, polymethyl methacrylate, polymethyl acrylate, polyvinyl alcohol, polymethacrylonitrile, polyvinyl acetate, polyvinyl pyrrolidone, polyethyleneimine, polybutadiene, polystyrene, polyisoprene, and derivatives thereof may be used singly or in admixture. Alternatively, a polymer obtained by the copolymerization of various monomers constituting the foregoing polymers may be used. Alternatively, an inorganic material may be used besides the foregoing polymers. A mixture of inorganic material and organic material may be used.

In the preparation of the batteries (A) and (E) of the foregoing example, the film formed on the particulate active material was rendered porous by removing grains from the polymer film covering the particulate active material or by a casting-extraction method. The present invention is not limited to these porous treatment processes. Either the use of a foaming agent or the solidification of the polymer solution by cooling may be employed.

In the nonaqueous electrolytic batteries of the foregoing examples, as the organic electrolyte solution there was used a mixture of EC and DEC. However, the present invention is not limited to this electrolyte solution. For example, a polar solvent such as ethylene carbonate, propylene carbonate, dimethyl carbonate, diethyl carbonate, γ-butyrolactone, sulfolan, dimethyl sulfoxide, acetonitrile, dimethylformamide, dimethylacetamide, 1,2-methyltetrahydrofuran, dioxolan and methyl acetate or a mixture thereof may be used.

In the foregoing examples, as the lithium salt to be incorporated in the organic electrolyte solution there was used $LiPF_6$. Besides this lithium salt, a lithium salt such as $LiBF_4$, $LiAsF_6$, $LiClO_4$, LiSCN, LiI, $LiCF_3SO_3$, LiCl, LiBr and $LiCF_3CO_2$ or a mixture thereof may be used.

In the foregoing examples, as the compound capable of intercalating and deintercalating lithium as a positive material there was used $LiCoO_2$. However, the present invention is not limited to this compound. Besides this compound, a composite oxide represented by the composition formula $Li_xMO_2$ or $Li_yM_2O_4$ (in which M represents a transition metal, x represents a number of from not less than 0 to not more than 1, and y represents a number of from not less than 0 to not more than 2), an oxide having tunnel-like voids and a lamellar metallic chalogen may be used. Specific examples of these compounds include $LiCoO_2$, $LiNiO_2$, $LiMn_2O_4$, $Li_2Mn_2O_4$, $MnO_2$, $FeO_2$, $V_2O_5$, $V_6O_{13}$, $TiO_2$, and $TiS_2$. Examples of organic compound capable of intercalating and deintercalating lithium include electrically-conductive polymers such as polyaniline. Further, a mixture of the foregoing active materials may be used regardless of which they are inorganic or organic.

In the foregoing examples, as the compound to be used as a negative active material there was used carbon. Besides carbon, an alloy of Al, Si, Pb, Sn, Zn or Cd with lithium, a composite transition metal oxide such as $LiFe_2O_3$, $MoO_2$, a transition metal oxide such as tin oxide, a carbon-based material such as high crystallinity graphite, lithium nitride such as $Li_5(Li_3N)$, metallic lithium, or a mixture thereof may be used.

In the foregoing examples, a film was formed on the particulate negative active material. Alternatively, a filler was held in the pores in the negative active material. However, even if a film is formed on the particulate active positive electrode or a filler is held in the pores in the positive active material, a nonaqueous electrolyte battery excellent in safety, charged storage properties and high rate charge-discharge properties can be provided as in the case of negative electrode.

In the foregoing examples, as the current collector for positive and negative electrodes there was used a stainless steel sheet or foamed nickel. However, the present invention is not limited to these materials. Any of iron, copper, aluminum, stainless steel and nickel may be used. The current collector employable herein may be in the form of sheet, foamed body, sintered porous body or the like.

In accordance with the present invention, the safety and high rate charge-discharge properties of batteries can be improved by covering the particulate active material with a porous film or holding a filler in pores in the active material.

As mentioned above, one aspect of the electrode for nonaqueous electrolyte battery according to the present invention comprises a particulate active material having a porous film formed thereon. In this arrangement, the amount of an organic electrolyte solution in contact with the active material can be drastically reduced, making it possible to inhibit the reaction of the active material with the organic electrolyte solution and hence remarkably improve the safety and charged storage properties of the battery. Further, the particulate active material is covered by a film. Therefore, unlike the conventional solid electrolyte battery, the nonaqueous electrolyte battery comprises a solid electrolyte having an extremely small thickness and an organic electrolyte solution present even in the vicinity of the particulate active material. Ion can easily migrate in an organic electrolyte solution. Thus, ion can diffuse through an organic electrolyte solution at a high rate. Further, since the film covering the active material is porous, the electrolyte solution can be contained in the pores in the film so that ion can readily diffuse in the pores, providing a battery excellent in high rate charge-discharge properties. Even if the film is porous, the amount of the organic electrolyte solution in contact with the active material can be drastically reduced. As a result, a battery excellent all in safety, charged storage properties and high rate charge-discharge properties can be provided. Further, by making the porous film lithium ionically-conductive, a battery more excellent in high rate charge-discharge properties can be provided.

One aspect of the nonaqueous electrolyte battery according to the present invention comprises an active material having a filler held in pores. Also in this nonaqueous electrolyte battery, the contact area of the particulate active material with the electrolyte solution can be drastically reduced as in the electrode comprising a particulate active material having a porous film formed thereon. Further, since the amount of the organic electrolyte solution in the vicinity of the particulate active material can be reduced, the self discharge reaction of the active material with the electrolyte solution and the explosive exothermic reaction of the active material with the electrolyte solution during the rise in the inner temperature of the battery can be inhibited, making it possible to remarkably improve the safety and charged storage properties of the battery. Further, since lithium ion can migrate in the solid phase of the particulate active material, and the transport number of lithium ion in this case is 1, lithium ion can rapidly migrate throughout the particulate active material even if no electrolyte solution is present in the pores of the particulate active material. Accordingly, the resulting battery is excellent all in safety, charged storage properties and high rate charge-discharge properties. In a nonaqueous electrolyte battery comprising an electrode comprising an active material having a filler held in pores, the particulate active material comes in contact with the electrolyte solution on the surface thereof other than the inner surface of the pores. Thus, the battery exhibits very excellent high rate charge-discharge properties. An electrode comprising a particulate active material having a filler held in pores, said particulate active material being covered by a lithium ionically-conductive film or porous film, can provide a battery having very excellent safety and charged storage properties. The conventional solid electrolyte battery is liable to the peeling of the active material off the electrolyte at the interface thereof due to the volumetric expansion and shrinkage of the active material during charge-discharge. In a nonaqueous electrolyte battery comprising an electrode comprising an active material having a filler held in pores according to the present invention, the material which has filled the pores in the particulate active material cannot easily come out of the pores even if the active material undergoes volumetric expansion and shrinkage during charge-discharge. Thus, in the present invention, even if the active material undergoes volumetric expansion and shrinkage during charge-discharge, the safety and charged storage properties of the battery can be improved.

In a lithium ion battery comprising a carbon-based negative electrode represented by $Li_xC_6$, as the percent utilization of negative electrode is raised and intercalation proceeds, the rise in the temperature and pressure in the battery due to internal short or other troubles causes lithium and carbon in the negative electrode to react with each other to produce lithium carbide ($Li_2C_2$) with the generation of heat. As a result, the inner pressure of the battery shows a sudden further rise. Thus, this lithium ion battery leaves something to be desired in safety. Accordingly, at present, the percent utilization of the carbon-based negative electrode is limited to less than 60% ($Li_xC_6$, $0 \leq x < 0.6$) taking into account the safety, making it impossible to obtain a practical battery having a high energy density. The application of the present invention to a lithium-based battery comprising a carbon-based negative electrode, if the amount of the organic electrolyte solution present in the vicinity of the particulate active material is reduced, makes it difficult to raise the inner pressure in the vicinity of the active material because there is less electrolyte solution in the vicinity of the active material. Thus, the lithium carbide production reaction can be inhibited, making it possible to drastically improve the safety of the battery. Accordingly, the present invention is very effective for a lithium ion battery comprising a carbon-based negative electrode.

As the carbon-based negative electrode to be used in a lithium ion battery there may be mainly used graphite having a high degree of crystallization and carbon having a low degree of crystallization. The particulate negative active material made of carbon has more pores than the particulate negative active material made of graphite. Accordingly, the conventional battery comprising an organic electrolyte solution contains a large amount of an organic electrolyte solution in the particulate negative active material and thus leaves something to be desired in safety. The application of the present invention to a lithium ion battery comprising a carbon-based negative electrode, if an active material having a filler held in pores is used, makes it possible to drastically reduce the amount of the electrolyte solution in the particulate active material and hence drastically improve the safety and charged storage properties of the battery.

Thus, a nonaqueous electrolyte battery which exhibits better safety and charged storage properties than the conventional nonaqueous electrolyte battery and better high rate charge-discharge properties than the conventional solid electrolyte battery can be provided.

The features of the present invention are as follows:

1. An electrode for nonaqueous electrolyte battery comprising a particulate active material having a porous film formed thereon.

2. An electrode for nonaqueous electrolyte battery comprising an active material having a filler held in pores.

3. An electrode for nonaqueous electrolyte battery comprising an active material which undergoes volumetric expansion and shrinkage during charge-discharge, having a filler held in pores.

4. An electrode for nonaqueous electrolyte battery comprising a particulate active material having a porous lithium ionically-conductive film formed thereon.

5. The electrode for nonaqueous electrolyte battery according to any one of Clauses 1 to 4, comprising a carbon-based negative active material.

6. The electrode for nonaqueous electrolyte battery according to Clause 5, comprising a low crystallinity carbon as an negative active material.

7. The electrode for nonaqueous electrolyte battery according to any one of Clauses 1 to 6, wherein said film to be formed on said particulate active material or said material to fill the pores in the active material is a polyvinylidene fluoride, polyvinyl chloride, polyacrylonitrile or a copolymer comprising as main components monomers constituting these compounds.

8. A process for the preparation of a particulate active material having a porous film formed thereon, which comprises covering a particulate active material by a polymer film, and then removing the grains from the polymer film so that said film is rendered porous.

9. A process for the preparation of a particulate active material having a porous film formed thereon, which involves porous treatment by a casting-extraction method. Industrial applicability.

In accordance with the present invention, an electrode for nonaqueous electrolyte battery having excellent safety and charged storage properties and good high rate charge-discharge properties can be provided.

What is claimed is:

1. An electrode for nonaqueous electrolyte battery comprising a particulate active material, wherein particles of the active material have a porous film formed thereon and lithium ions move through the pores in the film and through the film formed on the particles of the active material.

2. A negative electrode for nonaqueous electrolyte battery comprising a carbon-based negative active material having a filler held in pores, wherein the pores exist in an active material grain and the active material grain has an outer surface which is not coated by the filler, such that electrolyte can come into contact with the active material grain at the outer surface.

3. A negative electrode for nonaqueous electrolyte battery comprising a carbon-based negative active material which undergoes volumetric expansion and shrinkage during charge-discharge, having a filler held in pores, wherein the pores exist in an active material grain and the active material grain has an outer surface which is not coated by the filler, such that electrolyte can come into contact with the active material grain at the outer surface.

4. The electrode for nonaqueous electrolyte battery according to claim 1, wherein said active material is a carbon-based material.

5. An electrode for nonaqueous electrolyte battery according to claim 4, comprising a low crystallinity carbon as a negative active material.

6. An electrode for nonaqueous electrolyte battery according to claim 1, wherein said film to be formed on said particulate active material is a polyvinylidene fluoride, polyvinyl chloride, polyacrylonitrile or a copolymer comprising as main components monomers constituting these compounds.

7. A negative electrode for nonaqueous electrolyte battery according to claim 2, comprising a low crystallinity carbon as a negative active material.

8. An electrode for nonaqueous electrolyte battery according to claim 2, wherein said material to fill the pores in the active material is a polyvinylidene fluoride, polyvinyl chloride, polyacrylonitrile or a copolymer comprising as main components monomers constituting these compounds.

9. A negative electrode for nonaqueous electrolyte battery according to claim 3, comprising a low crystallinity carbon as a negative active material.

10. An electrode for nonaqueous electrolyte battery according to claim 3, wherein said material to fill the pores in the active material is a polyvinylidene fluoride, polyvinyl chloride, polyacrylonitrile or a copolymer comprising as main components monomers constituting these compounds.

11. An electrode for nonaqueous electrolyte battery according to claim 1, wherein said film to be formed on said particulate active material is a polyvinylidene fluoride.

12. An electrode for nonaqueous electrolyte battery according to claim 1, wherein said film to be formed on said particulate active material is a polyvinyl chloride.

13. An electrode for nonaqueous electrolyte battery according to claim 1, wherein said film to be formed on said particulate active material is a polyacrylonitrile.

14. An electrode for nonaqueous electrolyte battery according to claim 1, wherein said film to be formed on said particulate active material is a copolymer comprising as main components monomers constituting polyvinylidene fluoride, polyvinyl chloride, and polyacrylonitrile.

15. A negative electrode for nonaqueous electrolyte battery according to claim 2, wherein the active material grain has an outer surface which is not coated by the filler, such that electrolyte can come into contact with active material grain at the outer surface but not in the pores.

16. A negative electrode for nonaqueous electrolyte battery according to claim 3, wherein the active material grain has an outer surface which is not coated by the filler, such that electrolyte can come into contact with the active material grain at the outer surface but not in the pores.

* * * * *

UNITED STATES PATENT AND TRADEMARK OFFICE
CERTIFICATE OF CORRECTION

PATENT NO. : 6,534,218 B1
DATED : March 18, 2003
INVENTOR(S) : Okada, Mikio and Yasuda, Hideo It is certified that error appears in the above-identified patent and that said Letters Patent is hereby corrected as shown below:

<u>Title page,</u>
Insert Items:
-- [22] PCT Filed: February 10, 1997
  [86] PCT NO.: PCT/JP97/00350
  [87] PCT Pub. No.: WO97/29522
      PCT Pub. Date: August 14, 1997 --

Signed and Sealed this

Thirty-first Day of August, 2004

JON W. DUDAS
*Director of the United States Patent and Trademark Office*